(12) United States Patent
Denisart et al.

(10) Patent No.: US 8,359,968 B2
(45) Date of Patent: Jan. 29, 2013

(54) CONTROL DEVICE HAVING A PERISTALTIC VALVE FOR A DRINK PREPARING MACHINE

(75) Inventors: Jean-Luc Denisart, Cully (CH); Jean-Paul Denisart, La Conversion (CH); Enzo Bonacci, Savigny (CH); HansPeter Pleisch, Corseaux (CH); Christian Talon, Vufflens-le-château (CH)

(73) Assignee: Nestec S.A., Vevey (CH)

( * ) Notice: Subject to any disclaimer, the term of this patent is extended or adjusted under 35 U.S.C. 154(b) by 546 days.

(21) Appl. No.: 12/600,228

(22) PCT Filed: May 7, 2008

(86) PCT No.: PCT/EP2008/055596
§ 371 (c)(1),
(2), (4) Date: Nov. 13, 2009

(87) PCT Pub. No.: WO2008/138820
PCT Pub. Date: Nov. 20, 2008

(65) Prior Publication Data
US 2010/0300300 A1   Dec. 2, 2010

(30) Foreign Application Priority Data
May 16, 2007   (EP) .................................... 07108296

(51) Int. Cl.
*A47J 31/00*   (2006.01)

(52) U.S. Cl. ............. 99/280; 99/263; 99/300; 99/302 R

(58) Field of Classification Search ............... 99/280, 99/281, 282, 283, 299, 300, 302 R, 305, 307
See application file for complete search history.

(56) References Cited

U.S. PATENT DOCUMENTS

| | | | |
|---|---|---|---|
| 3,861,421 A | 1/1975 | Thompson | 137/636.4 |
| 4,061,142 A | 12/1977 | Tuttle | 128/214 R |
| 4,328,834 A | 5/1982 | Oates, Sr. et al. | 137/636.1 |
| 4,792,059 A * | 12/1988 | Kerner et al. | 222/67 |
| 5,007,446 A | 4/1991 | Grove | 137/72 |
| 5,042,689 A * | 8/1991 | Mrugala et al. | 222/66 |
| 5,462,251 A | 10/1995 | Kawabe | 251/4 |
| 5,975,365 A * | 11/1999 | Hsieh | 222/129.4 |
| 7,654,191 B2 * | 2/2010 | Greenwald et al. | 99/275 |
| 7,930,972 B2 * | 4/2011 | Denisart et al. | 99/295 |
| 2003/0066431 A1 * | 4/2003 | Fanzutti et al. | 99/279 |
| 2009/0151574 A1 * | 6/2009 | Nijboer et al. | 99/282 |

OTHER PUBLICATIONS

International Search Report, PCT/EP2008/055596, mailed Jul. 2, 2008.

\* cited by examiner

*Primary Examiner* — Reginald L Alexander
(74) *Attorney, Agent, or Firm* — Winston & Strawn LLP

(57) ABSTRACT

A drink preparing machine that includes a tank, a water supply system having at least a section for heated water and a section for unheated water, a pump for conveying water from the tank through the supply system as far as a module for preparing the drink, and a valve device arranged so as to control the selective opening and closing of the supply system sections. The valve device is a peristaltic system that includes a compression member for compressing a tube of each supply system section and acting under the effect of an elastic return member.

16 Claims, 4 Drawing Sheets

CONTROL DEVICE HAVING A PERISTALTIC VALVE FOR A DRINK PREPARING MACHINE

This application is the 371 filing of International patent application PCT/EP2008/055596 filed May 7, 2008.

BACKGROUND

The invention relates to a control device of the type having a peristaltic valve allowing the selective opening and closing off of water supply tubes to be controlled. The invention can be applied particularly advantageously to drink dispensing machines, in particular, in order to control the selective opening and closing off of several supply tubes, such as, for example, a hot water supply and a cold water supply.

Lever-controlled devices having a peristaltic valve exist for a variety of applications.

Patent U.S. Pat. No. 3,861,421 relates to a mixer comprising a device for selectively pinching two tubes and using a cam acting in association with compression levers.

Patent U.S. Pat. No. 4,328,834 relates to a pinching valve for an iron which uses a rocker to selectively squash two tubes against a convex surface in order to selectively allow water or steam to pass through.

Patent U.S. Pat. No. 4,061,142 relates to a device for controlling the flow of blood through two tube portions using a pair of clamping arms mounted such that they pivot on a support and are made to close by a central cam. The device comprises elastic means in the form of leaf springs which are held in tension by the central cam. One drawback of such a device relates to the high tensile forces maintaining significant squashing of the tubes which can rapidly damage them such that they do not regain their initial elasticity, the lack of stability in the various positions and a lack of smoothness due to the tensioning of the leaf springs causing significant tensile forces.

In particular, for an application in the field of drink preparing appliances, there is a need for a peristaltic valve device having greater smoothness when passing from one position to another and better stability in each of the positions assumed by the valve.

SUMMARY OF THE INVENTION

For this purpose, the invention relates to a control device having a peristaltic valve for controlling the selective opening and closing off of a first and a second tube passing through the device, the said device comprising:

- an actuating means, such as a lever or the like, fixed to a rocker body;
- a base on which the body is mounted in order to rock about at least one neutral position (N), two selective closed-off/open positions (S1, S2) of the tubes comprising a closed-off position of a first tube and an open position of a second tube and an open position of the first tube and a closed-off position of the second tube; and
- tube compression means mounted on the base and able to be displaced against elastic return means by actuating the lever.

The elastic means are elastic return means arranged with respect to the rocker body in order:

- in the neutral position, to keep the compression means in the closed-off position against the two tubes with sufficient return tension to keep the two tubes closed off; and
- in the selective closed-off/open positions of the tubes, to keep the compression means selectively with a greater tension on one of the tubes so as to close off one of the tubes and at least partially open the other tube.

Thus, one advantage of the invention is also to keep the tubes closed off in the neutral position in order to prevent any flow. Thus the return tension of the elastic means may advantageously be designed to keep the tubes closed off under the residual pressure in the supply system.

According to one advantageous feature, the elastic return means are formed by at least one return spring provided between the rocker body and the compression means.

The return spring is preferably arranged so as to provide a stable position of the compression means in the selective closed-off/open position of the tubes and preferably also in the neutral closed-off position of the tubes. More specifically, the elastic means comprises two springs or two spring portions configured in an intersecting and symmetrical manner so as to act in opposition and keep the compression means at least under a certain amount of tension.

Greater stability can especially be obtained when the rocker body is mounted on the base on at least two parallel rotary pins.

In particular, each pin allows rotary displacement of the body with respect to the base towards one of the selective closed-off/open positions of the tubes.

In other words, the body is displaced around either one of the rotary pins depending on which side the body is pivoting towards in order to actuate the compression means. Moreover, in the neutral position, the rocker body rests on the two pivot pins, which allows the bearing forces to be distributed and thus provides greater stability.

Preferably, the tube compression means comprise two pinching arms pivoting on the base. These arms are positioned on each side of the base. They are mounted such that they can rotate on the base.

The compression means pinch each tube against a bearing surface of the base. In particular, the pinching arms can move towards the bearing surfaces which are preferably fixed on the base. The pinching of the tubes therefore occurs in the manner of a clip.

Correct pinching of the tubes is preferably obtained when the bearing surface of the base and the bearing surface of the pinching arms constitute convex clamping surfaces, preferably having a small radius. The radius of curvature of the surfaces depends of course on the diameter of the tubes. For example, the radius of the surface may be around 2-8 mm. The width of the convex surfaces is also chosen to exceed the width of the tubes when they are compressed. For example, the width of the convex surface is around at least 1.5 times the compressed width of the tubes.

According to one feature of the invention, the pinching arms are linked to the rocker body of the lever by springs constituting the elastic return means, the latter being arranged so as to assume a stable position passing beyond the axis of rotation during the rotary displacement of the body with respect to the base towards one of the selective closed-off/ open positions of the tubes. In such a "toggle"-type configuration, the stability of the selective closed-off/open positions is greatly improved. It results in a safer and more pleasant feeling for the user when handling the device. Moreover, effective closing off of the tubes in the neutral position is guaranteed over a large angular range, the opening of one of the tubes being carried out essentially during passage into the selective position. The device may also function as a safety valve in the event of excess pressure in the tubes, enabling in particular surplus steam to be released.

According to one feature, the springs have their points of attachment to the rocker body and to the said pinching arms in a configuration in which they intersect in the longitudinal plane to the base. This feature further contributes to the stability of the various closed-off positions of the device.

The device according to the invention also comprises at least one control switch. The switch is electrically connected to actuate a pump. The switch may be arranged such that the actuating part of the rocker body acts on the switch in one position of the rocker body with respect to the base.

The invention also relates to a machine for preparing hot or cold drinks, comprising a device as defined hereinabove. The water inlet tubes may convey water at different temperatures. The machine may comprise two water inlet tubes. A first water inlet tube may be a tube for heated water and a second water inlet tube may be a tube for unheated water.

According to another aspect, the invention relates to a drink preparing machine comprising:
 a tank;
 a water supply system comprising at least a section for heated water and a section for unheated water;
 a pump for conveying water from the tank through the supply system as far as a module for preparing the drink; and
 a valve device arranged so as to control the selective opening and closing off of the supply system sections;
 wherein the valve device is a peristaltic system comprising compression means compressing a tube of each supply system section and acting under the effect of elastic return means.

BRIEF DESCRIPTION OF THE DRAWING FIGURES

The invention will be better understood by reference to the description of the attached drawings, in which.

DETAILED DESCRIPTION OF THE INVENTION

Figure 1:
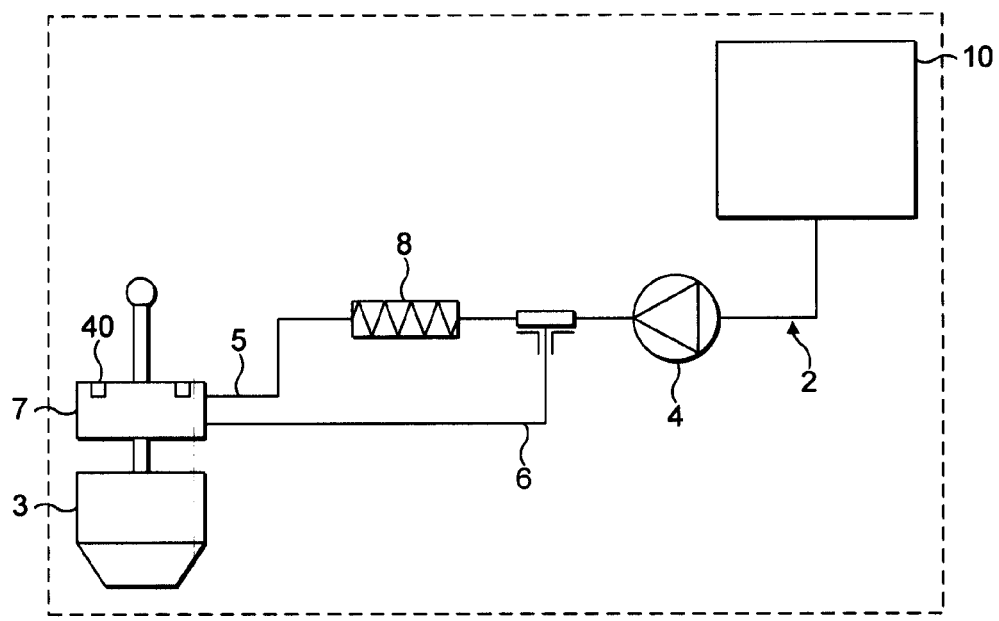
FIG. 1 shows an operating block diagram of a machine comprising a device according to the invention.

The device according to the invention may be used in a drink preparing machine such as a coffee machine with the reference 1 in FIG. 1.

The machine according to FIG. 1 typically comprises a water source such as a tank 10 containing water at ambient temperature. A water supply system 2 is provided, exiting the tank and leading to a brewing module 3 in which an ingredient such as coffee, tea or the like is brewed. The brewing module may be designed to receive a capsule, a sachet or any other suitable package containing the ingredient. The module may be designed to be pressurized by the brewing fluid. The pressure in the module and/or the package may reach several bar, for example 5 to 20 bar. For this purpose, a pump 4 is provided to supply the module with pressurized water. A suitable pump may be a piston pump or a diaphragm pump, or else a peristaltic pump. The supply system comprises two supply system branches constituting tubes 5, 6 leading to the peristaltic valve device 7 according to the invention. One of the branches or tube portions 5 is associated with a water heater such as a thermobloc or a heating cartridge 8. The other supply system branch or section 6 connects the pump, via a bypass tube from the outlet of the pump, to the peristaltic valve device in order to supply the module with cold water. A switch system 40 is associated with the peristaltic valve device in order to control the on/off mode of the pump, as will be explained hereinbelow.

The peristaltic valve device itself will be described in more detail in connection with the drawings according to FIGS. 2 to 7.

Figure 2:
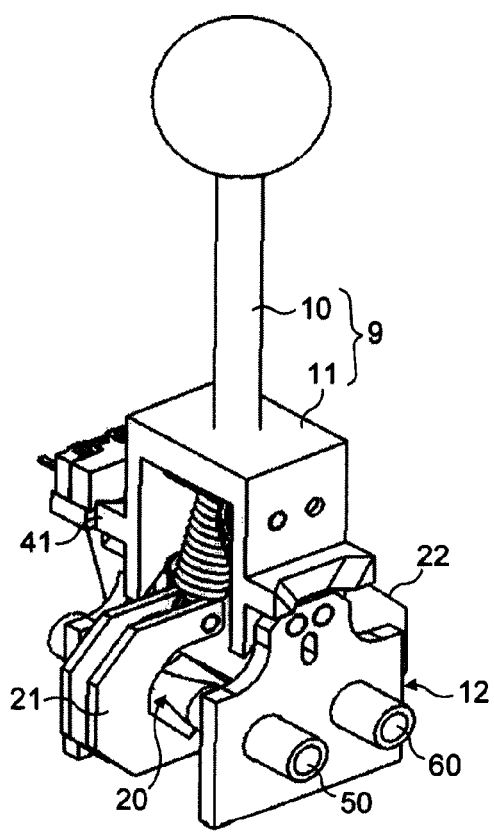
FIG. 2 shows a perspective view of a peristaltic valve device in a neutral position.

FIG. 2 shows a valve in the neutral position. The various constituent means of the valve are shown in exploded view in FIG. 6.

The device comprises a control block 9 comprising a lever 10 and a rocker body 11 fixed to the lever. The rocker body sits on a base 12 serving as a support in order to fix the device to the drink preparing machine.

On each side of the base are positioned rocking pins on which the body rests. More specifically, these pins comprise two parallel rotary pivot pins 13, 14. They are formed by cylinder portions fixed to one of the two side plates 15, 16 of the base and project towards the interior of the latter. On the rocker body, two lower indentations 17, 18 are provided, each comprising two housings in the form of open hollow half-cylinders which fit against the base cylinder portions in terms of support and rotation. It can be seen, therefore, that the rocker body can rock alternately about one or other of the rocking pins depending on which side it pivots towards when the lever is actuated.

The base 12 comprises, moreover, openings in each side plate allowing two tube portions 50, 60 to pass through. The tube portions are thus guided through the base in order to be received in a housing 20 on each side of the base.

The device comprises, moreover, two pinching arms 21, 22, on each side of the base, mounted such that they can rotate about a central rod 23 which forms a rotary pin for the arms and which is connected to the base. The rod 23 is fitted through two side plates of the base or may be injection-moulded as one piece therewith.

The pinching arms are placed opposite and parallel to the plane of travel of the lever. The pinching arms are disposed symmetrically on either side of the rod 23.

The pinching arms are arc-shaped and comprise a convex pinching part 29. The lower end of the arm ends in a length provided with an open notch 24 constituting an axis of rotation which engages against the central rotary rod 23. The arm can thus be easily mounted on the rod simply by clipping it on. On the base, a central block is provided comprising bearing surfaces 25 against which the tube portions are compressed.

These bearing surfaces have a convex cross section with a small radius allowing homogeneous squashing of the tube portion across its entire cross section. For example, the cross section of the bearing surface may have a radius of between 3 and 10 mm.

The pinching arms 21, 22 are connected to the rocker body by elastic return means. In this case, two return springs 30, 31 are each connected, on the on hand, by a pin or points of attachment 33 to the upper end 26 of each pinching arm and, on the other hand, to rods 27, 28 fixed to the rocker body. The springs may be of the helical or any other type. It should be noted that, in an equivalent manner, a single spring may be envisaged constituting two distinct elastic parts configured in the same manner.

The springs are disposed such that they intersect in the projection of the longitudinal plane. This arrangement allows the action of the springs to be coordinated in all positions and improves the stability in each position. The relative position of the springs with respect to the rotary pins 13, 14 is also important in order to ensure the stability of the device in the various positions of the lever.

The device also comprises at least one control switch 40 mounted on the base. The switch is configured with respect to the control supply system of the machine in order to control the turning on and off of the pump. The control switch is activated by the rocker body which can comprise a fixed activation part 41. The relative position of the rocker body determines the activation mode of the switch.

Figure 3:
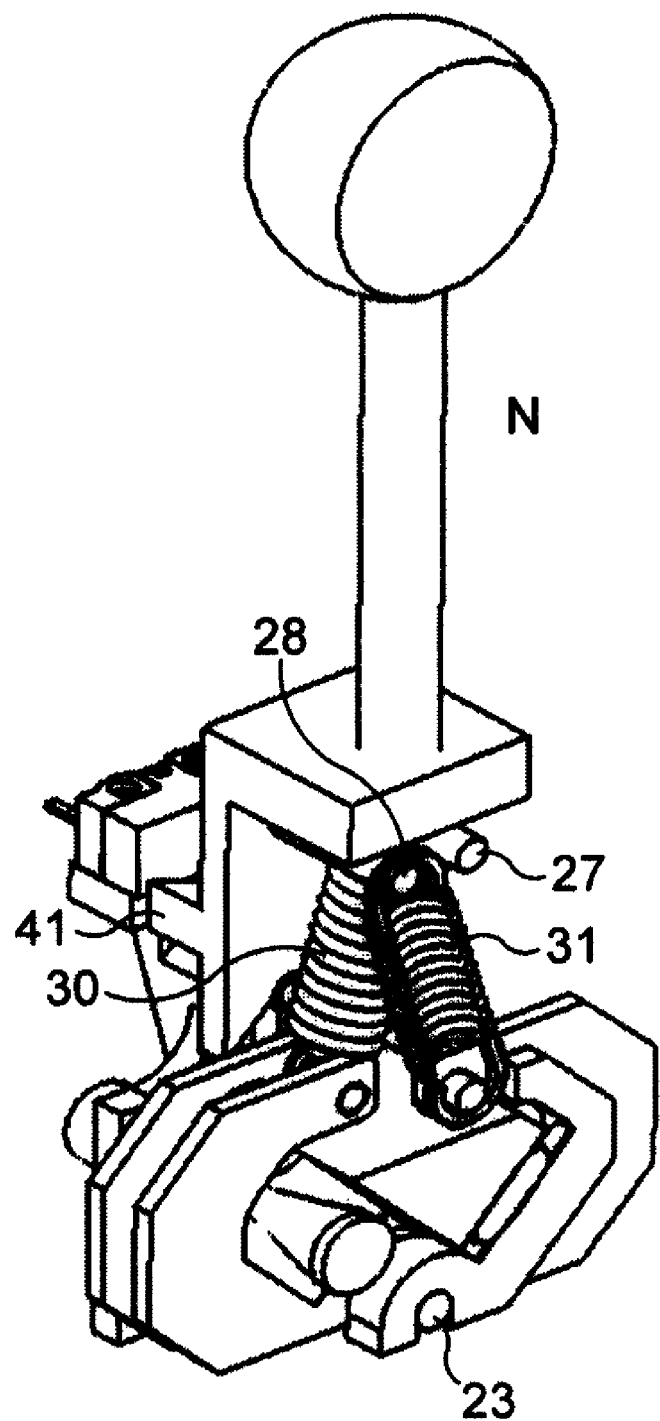
FIG. 3 shows a perspective view in section on a longitudinal plane of the device according to the invention in a neutral position.

In FIG. 3, the device is in the so-called "neutral" position (N) or balanced closed-off position of the tubes. In this mode, the lever is disposed vertically and thus the part 41 in relief does not act on the switch. The control supply system is thus closed off. The pump is off and the fluid thus does not flow in the tubes. The pressure upstream of the device is generally a residual water pressure keeping the pump primed only. The compression exerted on the tubes by the device is thus sufficient to prevent leaks. The rocker body bears against the two pins 13, 14. The bearing forces are thus distributed in a balanced manner over the two pins 13, 14 by the tension springs 30, 31. The two springs are under low tension but nevertheless under sufficient tension to force the two arms into traction and to compress the two tubes symmetrically. A tension of around 10 to 20 newtons is sufficient to close off the tubes in a sealed manner while the latter are under a low internal hydraulic pressure (for example around 1 to 7 bar). The tension is defined as a function of the stiffness of the tubes. The pressure while the pump is off is a residual pressure which is low in principle.

However, a higher pressure may cause the device to open, for example in the event of accidental excess pressure in the water heater in order to release a surplus of steam. In this case, the device acts as a safety valve and prevents the supply system from being kept for too long at too high a temperature.

Figure 4:
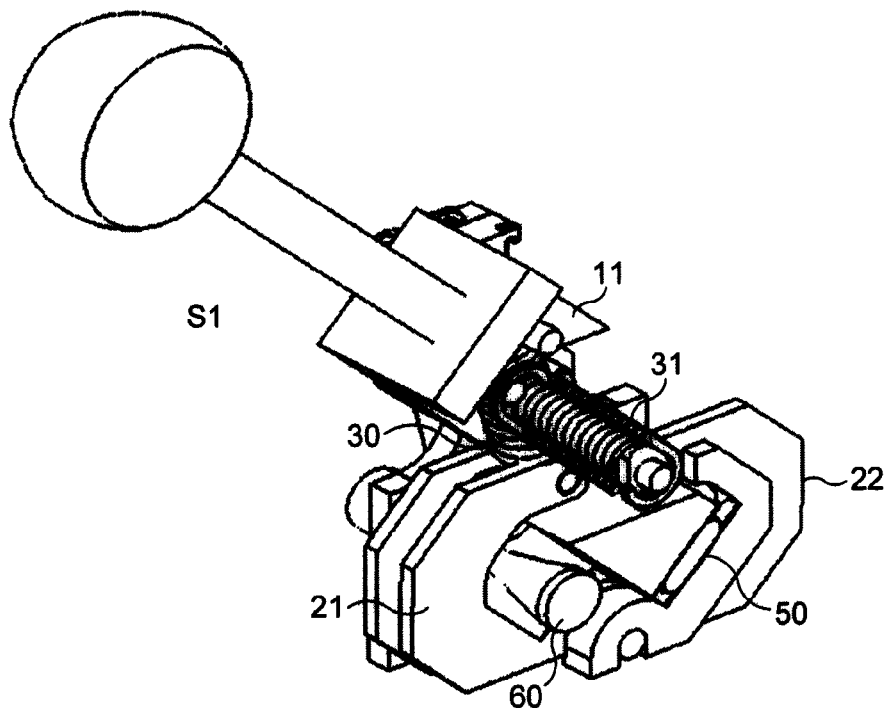
FIG. 4 shows a perspective view in section on a longitudinal plane of the device in a first position in which the first tube is closed off and the second tube is open.

In FIG. 4, the lever is in the closed-off position (S1) of the tube 50 and in the open position of the tube 60 (under the effect of its own elasticity and/or under the effect of the internal hydraulic pressure). In this mode, the rocker body 11 pivots about the rotary pin 14. The switch is thus activated in order to turn the pump on. The position of the rocker body puts the pinching arm 22 into traction. The return spring 31 acts on the pinching arm in traction with a greater traction force thus allowing the tube 50 to be closed off so as to resist the relatively high internal hydraulic pressure while the pump is working. The opposite spring 30 is thus in the relaxed position or under less tension allowing the tube to open in order to allow the pressurized liquid to pass through. The closing-off force exerted on the tube 50 may be at least around 45 newtons in order to resist a hydraulic pressure of at least 10 bar, for example up to 20 bar or more depending on the type of pressure pump.

Figure 5:
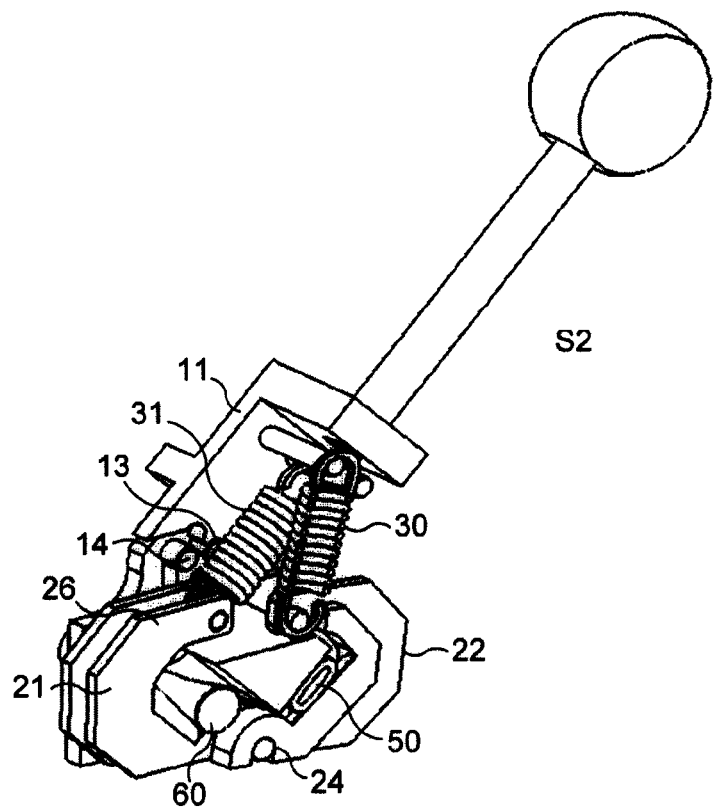
FIG. 5 shows a perspective view in section on a longitudinal plane of the device in a second position in which the second tube is closed off and the first tube is open.
Figure 6:
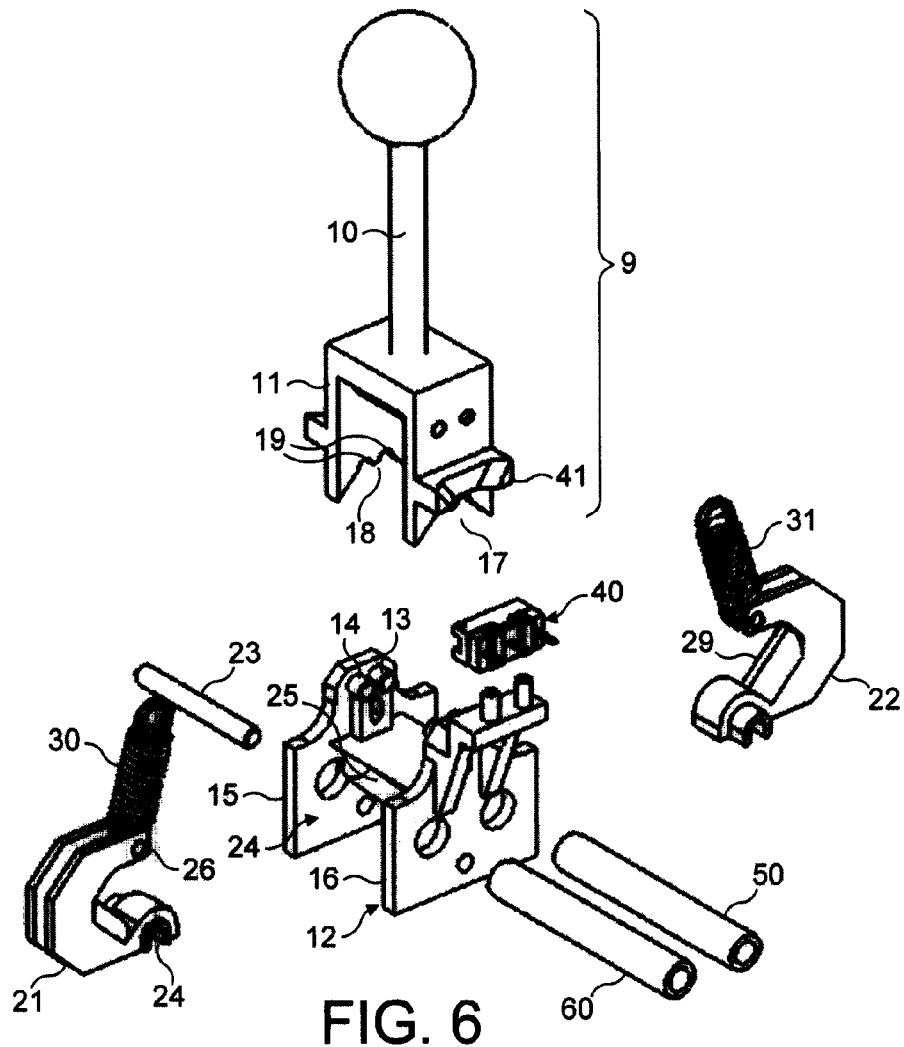
FIG. 6 shows an exploded view of the device.

In FIG. 5, the inverse position is shown, i.e. the lever is positioned in the closed-off position (S2) of the tube 60 and in the open position of the tube 50. The tube may thus be kept open by its own elasticity and/or under the effect of the hydraulic force. In this mode, the switch is once again in engagement with the part 41 in relief. The rocker body 11 pivots about the rotary pin 13. Thus it is the arm 21 that is pulled by the return spring 31.

Figure 7:
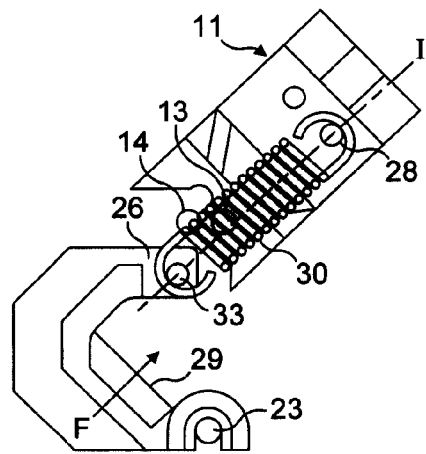
FIG. 7 shows a detail view of the return spring under tension in pinching mode.

FIG. 7 shows the stability effect obtained in the tension position applied when one of the tubes is closed off. This stability is obtained by the position of the spring axis (I) passing through these two pins 28, 33, which is now on the far side of the point of rotation 13 of the rocker body with respect to the base. The passage of the spring axis through the axis of rotation causes maximum tensioning of the spring. This results in the spring subjecting the arm to traction into a position reinforcing the compression (F) of the tube. The position of the lever is thus particularly stable since in order to begin to reopen the tube it is necessary to actuate the lever in the opposite direction (towards the neutral position) and put the spring under maximum tension at the moment it passes the point of the rotary pin 13. It should be noted that a stop can be provided on each side of the base in order to limit the travel of the block 9 in a maximum selective closed-off/open position.

Another advantage of the valve device according to the invention is that it allows liquid to be kept permanently in the hydraulic supply system and prevents the draining of the pump.

It goes without saying that the invention has been described on the basis of a preferred example, but it may cover numerous variants.

What is claimed is:

1. A drink preparing machine comprising:
   a tank;
   a water supply system comprising at least a section for heated water and a section for unheated water;
   a pump for conveying water from the tank through the supply system as far as a module for preparing the drink; and
   a valve device arranged so as to control the selective opening and closing of the supply system sections;
   wherein the valve device is a peristaltic system comprising a first tube in fluid association with the heated section water, a second tube in fluid association with the unheated section water, and compression means compressing a tube of each supply system section and acting under the effect of elastic return means comprising a spring;
   wherein the tubes are arranged to assume a neutral position, or a selective closed-off/open positions comprising a closed-off position of one tube and an open position of the other tube, with the compression means engaging the two tubes with sufficient return tension to keep both tubes simultaneously closed when in the neutral position; and with the compression means selectively providing a greater tension on one of the tubes so as to close off that tube and at least partially open the other tube when the tubes are in the selective closed off/open position.

2. The machine according to claim 1, wherein the valve device controls the selective opening and closing of the first and second tubes passing through the device, and further comprises:
   actuating means fixed to a rocker body;
   a base on which the body is mounted in order to rock about the neutral and selective closed/open positions;
   wherein the tube compression means is mounted on the base and able to be displaced against the elastic return means by actuating the actuating means.

3. The machine according to claim 2, wherein the elastic return means is arranged with respect to the rocker body in order to:
   close both tubes in the neutral position; and
   close one tube while maintaining the other tube open in the selective closed/open positions.

4. The machine according to claim 2, wherein the actuating means comprises a lever.

5. A drink preparing machine for preparing hot and cold drinks, comprising:
- a control device comprising a peristaltic valve for controlling the selective opening and closing of first and second tubes passing through the device, with the device comprising:
- actuating means fixed to a rocker body;
- a base on which the body is mounted in order to rock about at least one neutral position, two selective closed/open positions of the tubes comprising a closed position of a first tube and an open position of a second tube and an open position of the first tube and a closed position of the second tube; and
- tube compression means mounted on the base and able to be displaced against elastic return means by actuating the actuating means, wherein the elastic return means comprises at least one return spring provided between the body and the compression means;
- wherein the elastic means are elastic return means arranged with respect to the rocker body in order to:
- in the neutral position, keep the compression means in the closed position against the two tubes with sufficient return tension to keep the two tubes closed; and
- in the selective closed/open positions of the tubes, keep the compression means selectively with a greater tension on one of the tubes so as to close one of the tubes and at least partially open the other tube;
- wherein the tubes include a first tube for providing heated water, and a second for providing unheated water.

6. The machine according to claim 5, wherein the return spring is arranged so as to provide a stable position of the compression means in the selective closed/open position of the tubes.

7. A drink preparing machine for preparing hot and cold drinks, comprising:
- a control device comprising a peristaltic valve for controlling the selective opening and closing of first and second tubes passing through the device, with the device comprising:
- actuating means fixed to a rocker body;
- a base on which the body is mounted in order to rock about at least one neutral position, two selective closed/open positions of the tubes comprising a closed position of a first tube and an open position of a second tube and an open position of the first tube and a closed position of the second tube, wherein the rocker body is mounted on the base on at least two parallel rotary pins, each pin forming the rotary displacement of the body with respect to the base towards one of the selective closed/open positions of the tubes; and
- tube compression means mounted on the base and able to be displaced against elastic return means by actuating the actuating means;
- wherein the elastic means are elastic return means arranged with respect to the rocker body in order to:
- in the neutral position, keep the compression means in the closed position against the two tubes with sufficient return tension to keep the two tubes closed; and
- in the selective closed/open positions of the tubes, keep the compression means with a greater tension on one of the tubes so as to selectively close one of the tubes and at least partially open the other tube;
- wherein the tubes include a first tube for providing heated water, and a second for providing unheated water.

8. The machine according to claim 7, wherein that the tube compression means comprises two pinching arms pivoting on the base.

9. The machine according to claim 8, wherein the compression means pinch the tubes against a bearing surface of the base.

10. The machine according to claim 9, wherein the bearing surface of the base constitutes a convex surface.

11. The machine according to claim 8, wherein the pinching arms are linked to the rocker body of the lever by two springs or two spring portions constituting the elastic return means, the latter being arranged so as to assume a stable position passing beyond the axis of rotation during the rotary displacement of the body with respect to the base towards one of the selective closed/open positions of the tubes.

12. The machine according to claim 11, wherein the springs have their points of attachment to the rocker body and to the said pinching arms arranged in such a manner that they intersect in the projection of the longitudinal plane to the base.

13. A drink preparing machine for preparing hot and cold drinks, comprising:
- a control device comprising a peristaltic valve for controlling the selective opening and closing of first and second tubes passing through the device, with the device comprising:
- actuating means fixed to a rocker body;
- a base on which the body is mounted in order to rock about at least one neutral position, two selective closed/open positions of the tubes comprising a closed position of a first tube and an open position of a second tube and an open position of the first tube and a closed position of the second tube; and
- tube compression means mounted on the base and able to be displaced against elastic return means by actuating the actuating means;
- wherein the elastic means are elastic return means arranged with respect to the rocker body in order to:
- in the neutral position, keep the compression means in the closed position against the two tubes with sufficient return tension to keep the two tubes closed; and
- in the selective closed/open positions of the tubes, keep the compression means selectively with a greater tension on one of the tubes so as to close one of the tubes and at least partially open the other tube; and
- at least one control switch for actuating a pump which is configured to convey water to the tubes for preparing a drink, with the actuating means acting on the switch;
- wherein the tubes include a first tube for providing heated water, and a second for providing unheated water.

14. The machine according to claim 13, wherein the actuating means comprises a lever.

15. The machine according to claim 13, which further comprises a pump configured to be turned on in the selective closed/open positions of the tubes.

16. The machine according to claim 5, which further comprises a pump configured to be turned on in the selective closed/open positions of the tubes.

* * * * *